United States Patent
Tagami

(10) Patent No.: US 10,896,183 B2
(45) Date of Patent: Jan. 19, 2021

(54) INFORMATION PROCESSING APPARATUS, INFORMATION PROCESSING METHOD, AND NON-TRANSITORY COMPUTER READABLE RECORDING MEDIUM

(71) Applicant: YAHOO JAPAN CORPORATION, Tokyo (JP)

(72) Inventor: Yukihiro Tagami, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 521 days.

(21) Appl. No.: 15/694,295

(22) Filed: Sep. 1, 2017

(65) Prior Publication Data
US 2018/0129710 A1 May 10, 2018

(30) Foreign Application Priority Data
Nov. 10, 2016 (JP) .................................. 2016-219735

(51) Int. Cl.
| G06F 16/2455 | (2019.01) |
| G06F 16/35 | (2019.01) |
| G06N 20/00 | (2019.01) |
| G06N 5/02 | (2006.01) |

(52) U.S. Cl.
CPC ........ *G06F 16/24564* (2019.01); *G06F 16/35* (2019.01); *G06N 5/02* (2013.01); *G06N 20/00* (2019.01)

(58) Field of Classification Search
CPC ... G06F 16/24564; G06F 16/35; G06N 20/00; G06N 5/02
See application file for complete search history.

(56) References Cited

U.S. PATENT DOCUMENTS

| 2011/0302118 A1* | 12/2011 | Melvin ................... G06N 20/00 706/21 |
| 2015/0216432 A1* | 8/2015 | Yang ..................... A61B 5/7246 600/512 |
| 2016/0210532 A1* | 7/2016 | Soldevila ............. G06K 9/6215 |
| 2017/0011289 A1* | 1/2017 | Gao ....................... G06F 40/268 |
| 2018/0357531 A1* | 12/2018 | Giridhari ............. G06K 9/6267 |

FOREIGN PATENT DOCUMENTS

| JP | 2004-178569 A | 6/2004 |
| JP | 2010-079871 A | 4/2010 |
| JP | 2013-073256 A | 4/2013 |
| JP | 2013-246586 A | 12/2013 |

OTHER PUBLICATIONS

Jun. 21, 2017 Office Action issued in Japanese Patent Application No. 2016-219735.

* cited by examiner

*Primary Examiner* — Matthew J Ellis
(74) *Attorney, Agent, or Firm* — Oliff PLC

(57) ABSTRACT

An information processing apparatus according to the present application includes a classification unit, a conversion unit, a label acquiring unit. The classification unit that classifies a feature vector by using a classification vector, the feature vector being converted from target data. The conversion unit that converts the feature vector into an embedding vector in accordance with a conversion rule according to classification performed by the classification unit. The label acquiring unit that acquires, as one or more labels to be provided to the target data, one or more labels acquired based on the embedding vector converted by the conversion unit.

10 Claims, 8 Drawing Sheets

| CLUSTER NUMBER | CLASSIFICATION VECTOR |
|---|---|
| 1 | $w_1$ |
| 2 | $w_2$ |
| … | … |
| n | $w_n$ |

| CLUSTER NUMBER | EMBEDDING MATRIX |
|---|---|
| 1 | $V_1$ |
| 2 | $V_2$ |
| … | … |
| n | $V_n$ |

| OBJECT ID | EMBEDDING VECTOR | LABEL VECTOR |
|---|---|---|
| 00001 | $z_1$ | $y_1$ |
| 00002 | $z_2$ | $y_2$ |
| 00003 | $z_3$ | $y_3$ |
| … | … | … |

| REFERENCE-SOURCE OBJECT ID | REFERENCE-DESTINATION OBJECT ID | EDGE ID | DISTANCE |
|---|---|---|---|
| 00001 | 00003 | 00005 | 3028 |
|  | 00102 | 00468 | 249 |
|  | ... | ... | ... |
| 00002 | 00004 | 00152 | 2723 |
|  | 00082 | 00392 | 657 |
|  | ... | ... | ... |
| ... | ... | ... | ... |

| $x_i$ | $x_j$ |
|---|---|
| $(x_{i-1}, x_{i-2}, \cdots, x_{i-p})$ | $(x_{j-1}, x_{j-2}, \cdots, x_{j-p})$ |
| ... | ... |
| ... | ... |
| ... | ... |

| $z_i$ | $z_j$ |
|---|---|
| $(z_{i-1}, z_{i-2}, \cdots, z_{i-p})$ | $(z_{j-1}, z_{j-2}, \cdots, z_{j-p})$ |
| ... | ... |
| ... | ... |
| ... | ... |

D2

INFORMATION PROCESSING APPARATUS, INFORMATION PROCESSING METHOD, AND NON-TRANSITORY COMPUTER READABLE RECORDING MEDIUM

CROSS-REFERENCE TO RELATED APPLICATION(S)

The present application claims priority to and incorporates by reference the entire contents of Japanese Patent Application No. 2016-219735 filed in Japan on Nov. 10, 2016.

BACKGROUND OF THE INVENTION

1. Field of the Invention

The embodiment discussed herein is related to an information processing apparatus, an information processing method, and a non-transitory computer-readable recording medium.

2. Description of the Related Art

Conventionally, there is known a topic analyzing apparatus that provides a label, which is corresponding to a topic such as "politics" and "economics," to target data such as text data, an image, and a sound (for example, see Japanese Laid-open Patent Publication No. 2013-246586). For example, when the label is provided to a search word that is input from a user, a category in which the user is interested can be determined, whereby news recommendation to the user can be performed in a news site.

The topic analyzing apparatus converts target data into vector data so as to provide a label on the basis of the converted vector data. In this case, the topic analyzing apparatus performs learning by using training data to which the label is preliminary provided.

However, there exists, in some cases, a case where the conventional topic analyzing apparatus does not provide a label to target data precisely and fast.

SUMMARY OF THE INVENTION

It is an object of the present invention to at least partially solve the problems in the conventional technology.

According to one aspect of an embodiment, an information processing apparatus includes a classification unit, a conversion unit, a label acquiring unit. The classification unit that classifies a feature vector by using a classification vector, the feature vector being converted from target data. The conversion unit that converts the feature vector into an embedding vector in accordance with a conversion rule according to classification performed by the classification unit. The label acquiring unit that acquires, as one or more labels to be provided to the target data, one or more labels acquired based on the embedding vector converted by the conversion unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating one example of classification vector data 152 according to the embodiment;

FIG. 4 is a diagram illustrating one example of embedding-matrix data 157 according to the embodiment;

FIG. 5 is a diagram illustrating one example of label data 162 according to the embodiment;

FIG. 10 is a diagram illustrating one example of first learning data D1 according to the embodiment;

FIG. 11 is a diagram illustrating one example of second learning data D2 according to the embodiment.

DETAILED DESCRIPTION OF THE PREFERRED EMBODIMENT

Hereinafter, an embodiment of an information processing apparatus, an information processing method, and a non-transitory computer-readable recording medium will be described in detail with reference to the accompanying drawings. In the present embodiment, a label providing apparatus will be explained as one example of the information processing apparatus. The label providing apparatus is a device for providing a label, such as "politics," "economics," and "sports," in accordance with contents of target data. The label providing apparatus may be a device for providing a label to a server device, which manages web pages etc., by using a cloud service, or may be a device that is built in the above server device.

1. Use Environment of Label Providing Apparatus

Figure 1:
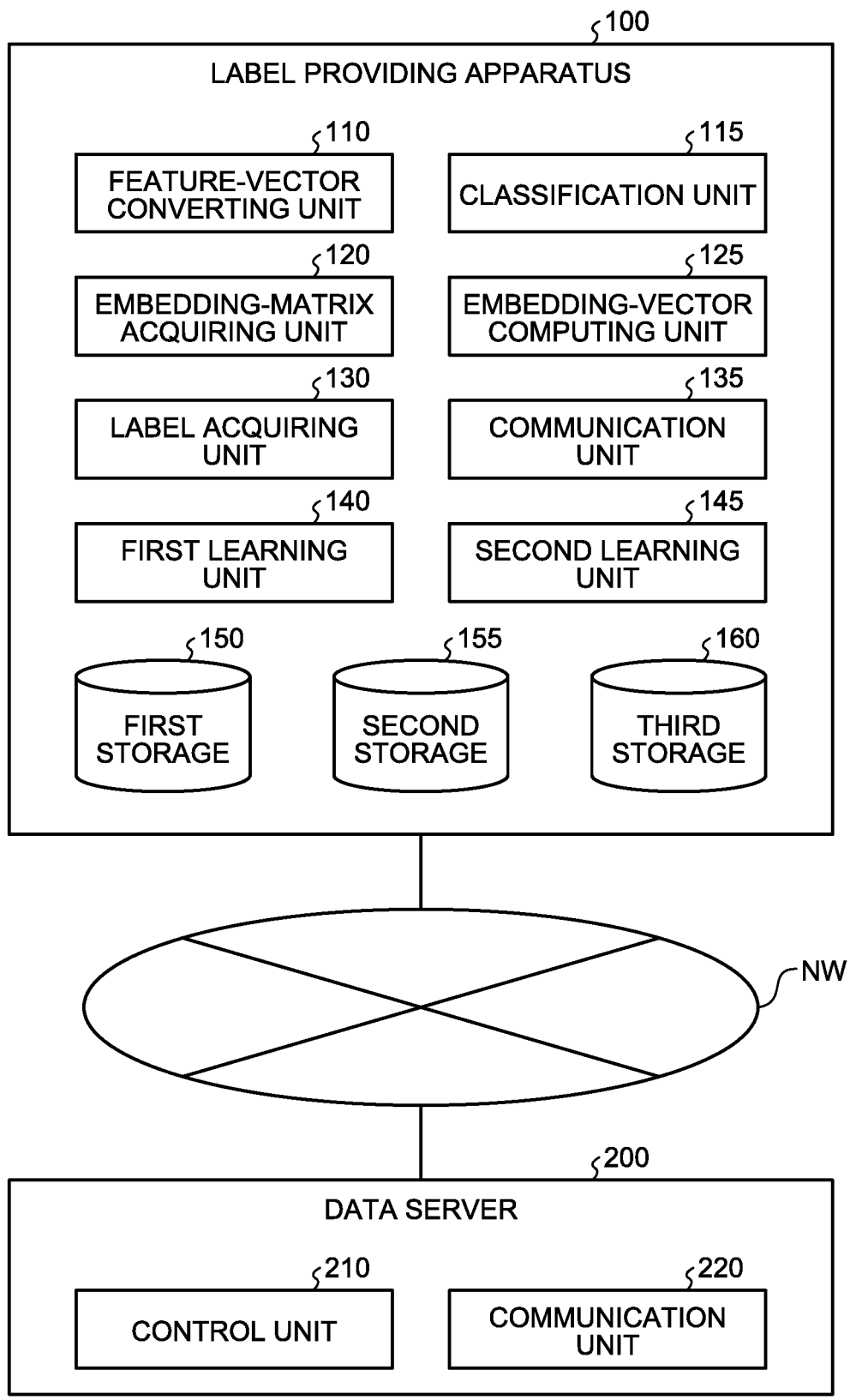
FIG. 1 is a diagram illustrating use environment of a label providing apparatus 100 according to an embodiment.

FIG. 1 is a diagram illustrating use environment of the label providing apparatus 100 according to the embodiment. The label providing apparatus 100 according to the embodiment communicates with a data server 200 through a network NW. The network NW includes a part or a whole of, for example, a Wide Area Network (WAN), a Local Area Network (LAN), the Internet, a provider device, a wireless base station, a dedicated line, etc.

The label providing apparatus 100 includes a feature-vector converting unit 110, a classification unit 115, an embedding-matrix acquiring unit 120, an embedding-vector computing unit 125, a label acquiring unit 130, a communication unit 135, a first learning unit 140, a second learning unit 145, a first storage 150, a second storage 155, and a third storage 160.

Each of the feature-vector converting unit 110, the classification unit 115, the embedding-matrix acquiring unit 120, the embedding-vector computing unit 125, the label acquiring unit 130, the first learning unit 140, and the second learning unit 145 may be realized by execution of a program by a processor of the label providing apparatus 100, may be realized by hardware such as a Large Scale Integration (LSI), an Application Specific Integrated Circuit (ASIC), a Field-Programmable Gate Array (FPGA), or may be realized by cooperation between the software and the hardware, for example.

The communication unit 135 includes, for example, a Network Interface Card (NIC). The label providing apparatus 100 communicates with the data server 200 by using the communication unit 135 through the network NW. Each of the first storage 150, the second storage 155, and the third storage 160 is realized by, for example, a Random Access Memory (RAM), a Read Only Memory (ROM), a Hard Disk Drive (HDD), a flash memory, a hybrid-type storage device obtained by combining one or more of these devices, or the like. A part or a whole of each of the first storage 150, the second storage 155, and the third storage 160 may be an external device to be accessed by the label providing apparatus 100, such as a Network Attached Storage (NAS) and an external storage server.

The data server 200 includes a control unit 210 and a communication unit 220. The control unit 210 may be realized by execution of a program by a processor of the data server 200, may be realized by hardware such as an LSI, an ASIC, and an FPGA, or may be realized by cooperation between the software and hardware, for example.

The communication unit 220 includes, for example, an NIC. The control unit 210 transmits target data to the label providing apparatus 100 through the network NW by using the communication unit 220. Target data includes a search query that is input by a user in a search site, for example, not limited thereto. For example, target data may include page data on a page browsed by a user, a Uniform Resource Locator (URL) of a page browsed by a user, an article that is posted in a blog (weblog) service, an article that is posted in a Social Networking Service (Step SNS), etc. Here the page data exists on a web, and is data per unit page, which can be browsed by a browser. For example, the page data includes image data and HyperText Markup Language (HTML) data. The page data may be data to be reproduced by an application program, not limited to the browser.

2. Label Providing Process to be Executed by Label Providing Apparatus

Figure 2:
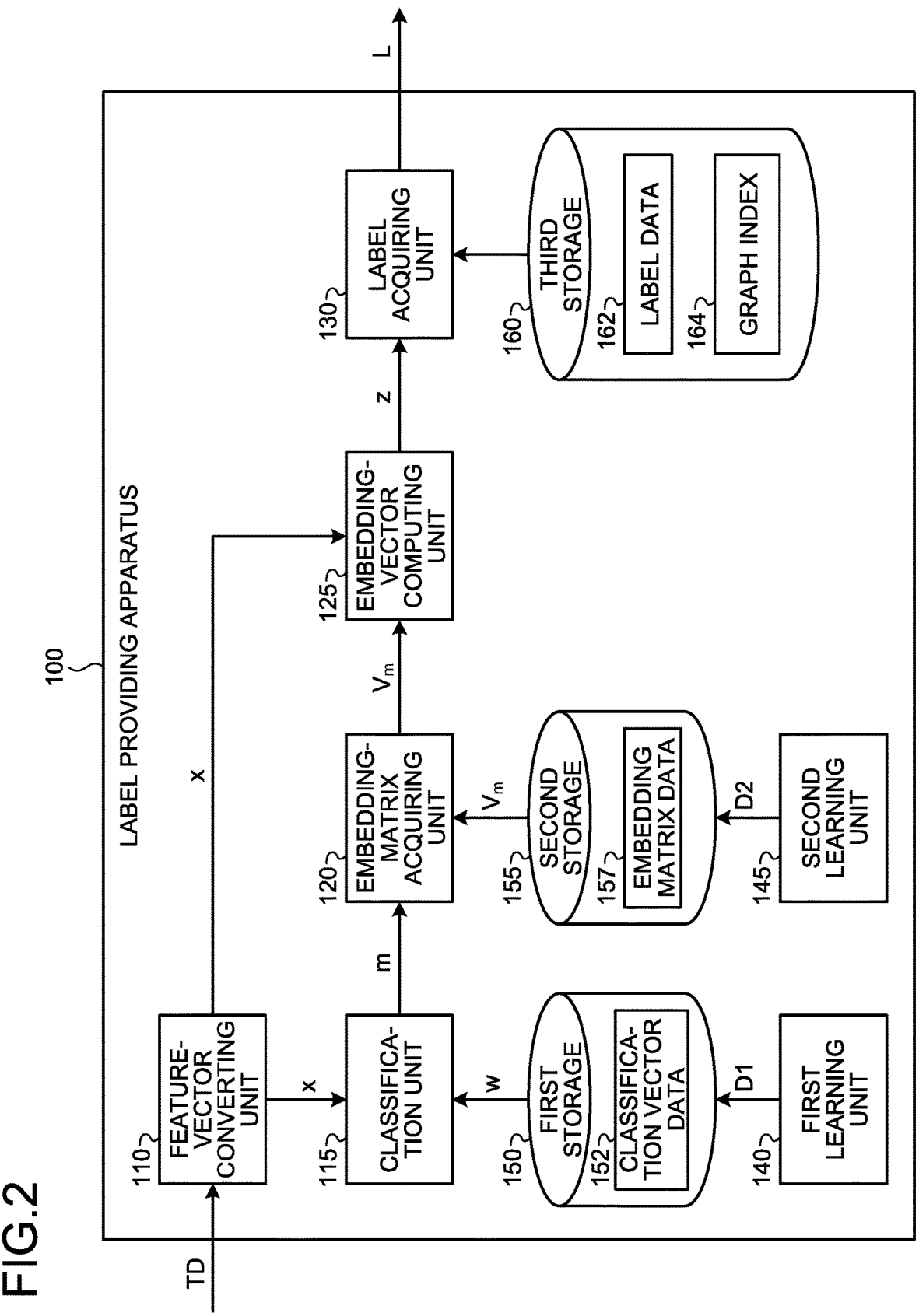
FIG. 2 is a block diagram illustrating a detailed configuration of the label providing apparatus 100 according to the embodiment.

FIG. 2 is a block diagram illustrating a detailed configuration of the label providing apparatus 100 according to the embodiment. The label providing apparatus 100 receives target data TD from the data server 200 so as to provide a label to the received target data TD. The label is data for classifying the target data TD, and is data indicating a genre to which the target data TD belongs, such as "politics," "economics," and "sports." Details are to be mentioned later, the label is provided to the target data TD. Hereinafter, details of the label providing operation of the label providing apparatus 100 will be explained.

The communication unit 135 receives the target data TD from the data server 200 so as to output the received target data TD to the feature-vector converting unit 110. The feature-vector converting unit 110 converts the target data TD input from the communication unit 135 into a feature vector x. For example, when the target data TD is a search query, the feature vector x may be a vector that indicates a set of words included in the search query. When the target data TD is page data, the feature vector x may be a vector that indicates a set of words included in the page data. The feature-vector converting unit 110 outputs the feature vector x to the classification unit 115 and the embedding-vector computing unit 125.

When the feature vector x is input to the classification unit 115 from the feature-vector converting unit 110, the classification unit 115 reads the classification vector data 152 from the first storage 150. The classification unit 115 classifies the input feature vector x into one of a plurality of clusters C1 to Cn by using the read classification vector data 152. Here "n" indicates a total number of the clusters. The classification unit 115 outputs a cluster number m of the cluster obtained by classifying the feature vector x to the embedding-matrix acquiring unit 120. Here "1≤m≤n" is satisfied. Hereinafter, a classifying process to be executed by the classification unit 115 will be specifically explained.

FIG. 3 is a diagram illustrating one example of the classification vector data 152 according to the embodiment. As illustrated in FIG. 3, the classification vector data 152 is data obtained by associating a cluster number and a classification vector with each other. In the example illustrated in FIG. 3, classification vectors w1 to wn are associated with respective cluster numbers 1 to "n."

The classification unit 115 reads the classification vector data 152 from the first storage 150. As described above, the classification vector data 152 includes the classification vectors "w1 to wn" that are respectively assigned to the plurality of clusters (cluster numbers 1 to "n"). The classification unit 115 derives the cluster number m whose cosine similarity (cos (wm, x)) between wm and x is maximum from among the cluster numbers 1 to "n," and outputs the derived cluster number m to the embedding-matrix acquiring unit 120.

When the cluster number m is input to the embedding-matrix acquiring unit 120 from the classification unit 115, the embedding-matrix acquiring unit 120 acquires an embedding matrix Vm corresponding to the input cluster number m from the second storage 155. The embedding-matrix acquiring unit 120 outputs the acquired embedding matrix Vm to the embedding-vector computing unit 125.

FIG. 4 is a diagram illustrating one example of the embedding-matrix data 157 according to the embodiment. As illustrated in FIG. 4, the embedding-matrix data 157 is data obtained by associating the cluster number and the embedding matrix with each other. In the example illustrated in FIG. 4, embedding matrices V1 to Vn are associated with the respective cluster numbers 1 to "n."

The embedding-matrix acquiring unit 120 reads the embedding-matrix data 157 from the second storage 155. As described above, the embedding-matrix data 157 includes the embedding matrices V1 to Vn that are respectively assigned to the plurality of clusters (cluster numbers 1 to "n"). The embedding-matrix acquiring unit 120 acquires the embedding matrix Vm from the second storage 155 on the basis of the cluster number m input from the classification unit 115. The embedding-matrix acquiring unit 120 outputs the acquired embedding matrix Vm to the embedding-vector computing unit 125.

When the feature vector x is input to the embedding-vector computing unit 125 from the feature-vector converting unit 110 and the embedding matrix Vm is input to the embedding-vector computing unit 125 from the embedding-matrix acquiring unit 120, the embedding-vector computing unit 125 computes an embedding vector z. Specifically, the embedding-vector computing unit 125 multiplies the feature vector x by the embedding matrix Vm acquired by the embedding-matrix acquiring unit 120 so as to compute the embedding vector z. The embedding-vector computing unit 125 outputs the computed embedding vector z to the label acquiring unit 130.

In this manner, the embedding-matrix acquiring unit 120 and the embedding-vector computing unit 125 function as a conversion unit for converting, in accordance with a conversion rule according to classification by the classification unit 115, the feature vector x into the embedding vector z.

When the embedding vector z is input to the label acquiring unit 130 from the embedding-vector computing unit 125, the label acquiring unit 130 reads the label data 162 and the graph index 164 from the third storage 160. The label acquiring unit 130 searches the label data 162 for an embedding vector similar to the embedding vector z by using an approximate nearest neighbor search to be mentioned later. The label acquiring unit 130 acquires the label vector y associated with the embedding vector acquired by using the approximate nearest neighbor search, and further acquires a label corresponding to the acquired label vector y as a label L to be provided to the target data TD. Hereinafter, details of a process for acquiring the label vector y will be explained.

FIG. 5 is a diagram illustrating one example of the label data 162 according to the embodiment. As illustrated in FIG. 5, the label data 162 is data obtained by associating an object ID, an embedding vector, and a label vector with one another. In the example illustrated in FIG. 5, embedding vectors z1, z2, z3, etc. and respective label vectors y1, y2, y3, etc. are associated with the object IDs 00001, 00002, 00003, etc. Herein, an embedding vector associated with a label vector will be referred to as an "object."

In this manner, the label data 162 is data obtained by associating a label vector as correct data with an embedding vector. The label acquiring unit 130 searches the label data 162 for an embedding vector similar to the embedding vector z input from the embedding-vector computing unit 125. Subsequently, the label acquiring unit 130 acquires, from the label data 162, the label vector y associated with the embedding vector obtained by the search.

Figures 6, 7:
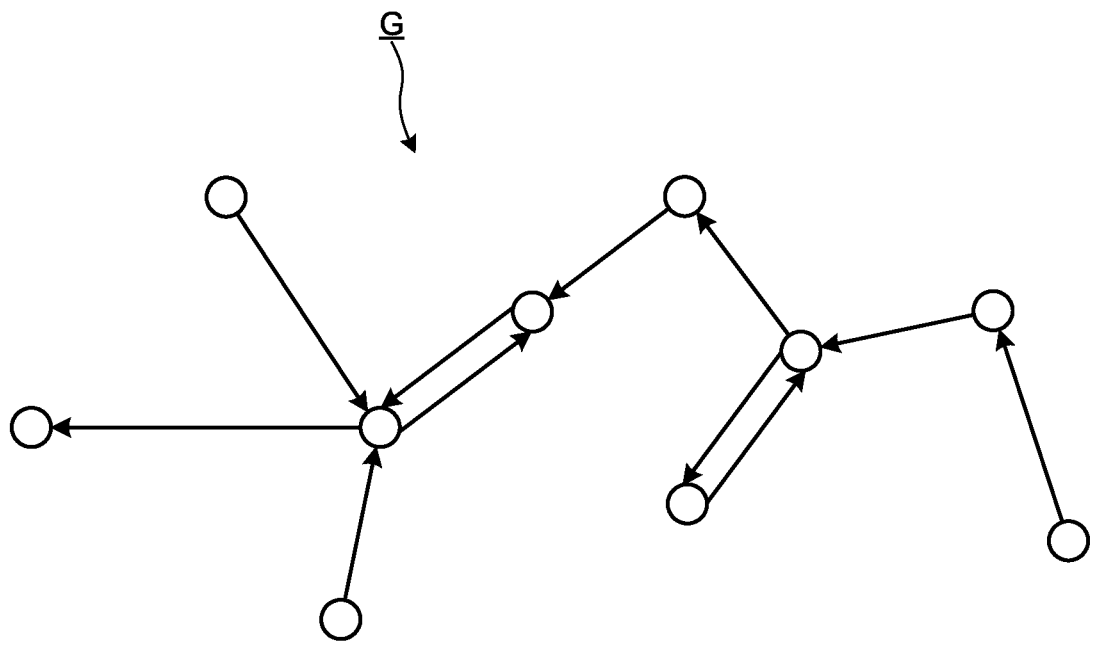
FIG. 6 is a diagram illustrating one example of graph index 164 according to the embodiment.
FIG. 7 is a diagram illustrating one example of a graph G of the graph index 164 according to the embodiment.

FIG. 6 is a diagram illustrating one example of the graph index 164 according to the embodiment. The graph index 164 is information on an edge that connects a plurality of objects, and is data having a graph structure formed by a set of directed edges for connecting reference-source objects with reference-destination objects. The edge has information that indicates a state where two objects are connected with each other. The directed edge is an edge by which data can be followed in only one direction during the search.

FIG. 7 is a diagram illustrating one example of the graph G of the graph indexes 164 according to the embodiment. In the graph G, a circle indicates an object and an arrow indicates a directed edge. As illustrated in FIG. 7, objects included in the graph index 164 are connected by directed edges.

As illustrated in FIG. 6, the graph index 164 is data obtained by associating information on (i) the reference-destination object IDs including identification information of reference-destination objects, (ii) edge IDs including identification information of directed edges connecting the reference-destination objects, and (iii) distances between a reference-source object and the reference-destination objects, etc. with the reference-source object ID including identification information of the reference-source object, for example. When objects are vectors, a distance therebetween is defined to be obtained by deriving an Lp norm (p=1, 2, . . . ) with respect to a difference between vector elements, for example.

The data configuration illustrated in FIG. 6 is merely one example, and another data configuration may be employed. For example, the graph index 164 may employ a data configuration in which other information is associated with the edge ID. Namely, in the present embodiment, a form of data configuration is not a substantial matter, and only when a distance is defined, data having any data configuration may be stored in the third storage 160. Normally, a distance means satisfaction of the distance axiom, however, a pseudo distance may be employed which does not satisfy the distance axiom. Although search performance may be reduced in a case of a pseudo distance, the pseudo distance may be employed when any advantage exists in usability in processes.

The label acquiring unit 130 extracts, as an object similar to the embedding vector z, an object existing within a predetermined distance from the embedding vector z from among objects that can be followed in directions from a reference-source object to reference-destination objects, by using edges defined by the graph index 164.

The label acquiring unit 130 may extracts, as an object similar to the embedding vector z, a predetermined number of objects in the order from shortest to longest distance from the embedding vector z from among objects that can be followed in directions from a reference-source object to reference-destination objects, by using edges defined by the graph index 164.

The searching process to be executed by the label acquiring unit 130 is realized by a process of a flowchart illustrated in FIG. 9 to be mentioned later, for example. In the flowchart illustrated in FIG. 9, an object set R is one example of a search result obtained by the label acquiring unit 130. In this case, when a predetermined number ks is adjusted to a desired value, the number of objects included in the search result can be adjusted.

By executing the above searching processes, the label acquiring unit 130 can acquire, from the label data 162, an embedding vector similar to the embedding vector z input from the embedding-vector computing unit 125. The label acquiring unit 130 acquires a label vector associated with the acquired embedding vector as the label vector y corresponding to a label to be provided to the target data TD. The label acquiring unit 130 acquires the label L corresponding to the acquired label vector y as the label to be provided to the target data TD. For example, the label acquiring unit 130 may derive the label L by using a table obtained by associating label vectors and labels with one another.

The label acquiring unit 130 outputs the acquired label L to the communication unit 135. The communication unit 135 transmits the label L input from the label acquiring unit 130 to the data server 200. By executing the above the above processes, the label providing apparatus 100 can provide the label L to the target data TD.

3. Flowchart of Label Providing Process

Figure 8:
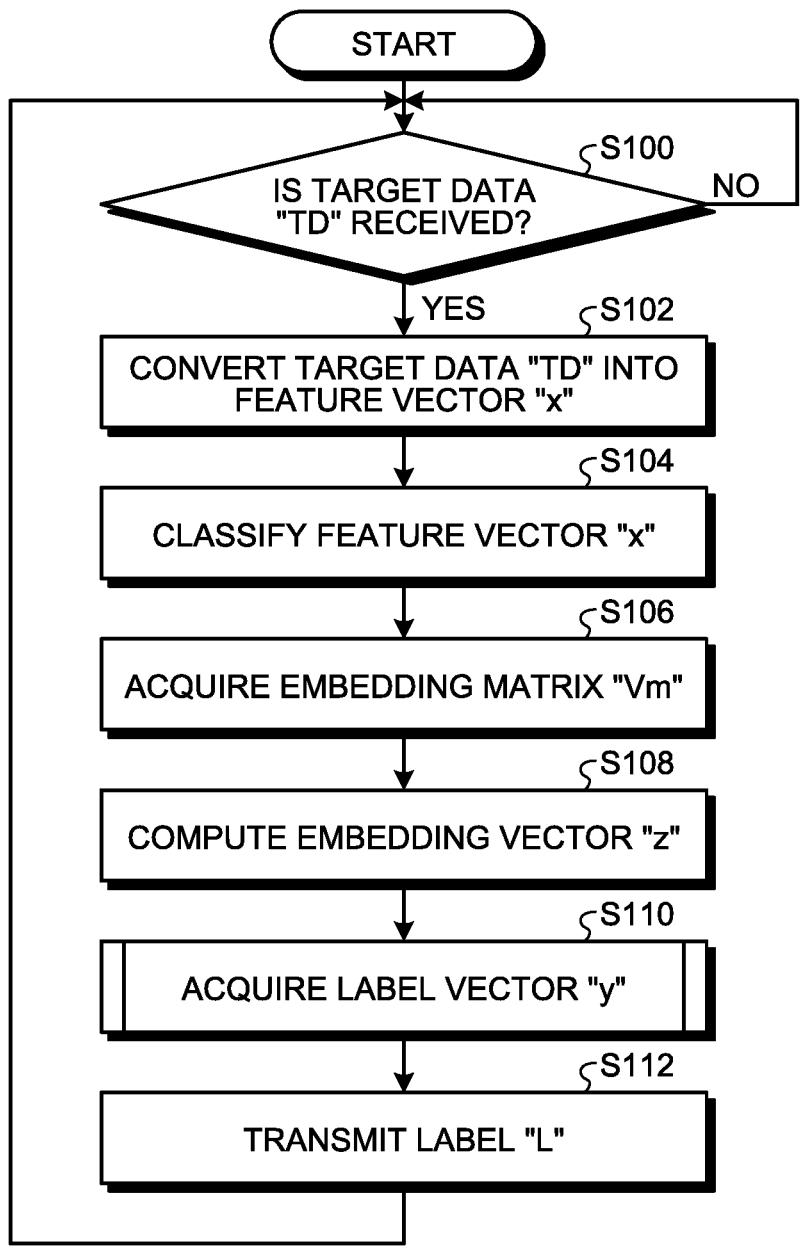
FIG. 8 is a flowchart illustrating a label providing process according to the embodiment.

FIG. 8 is a flowchart illustrating a label providing process according to the embodiment. The process indicated by this flowchart is to be executed by the label providing apparatus 100.

First, the label providing apparatus 100 determines whether or not the communication unit 135 receives the target data TD from the data server 200 (Step S100). When the communication unit 135 receives the target data TD from the data server 200, the feature-vector converting unit 110 converts the target data TD received by the communication unit 135 into the feature vector x (Step S102). The feature-vector converting unit 110 outputs the feature vector x to the classification unit 115 and the embedding-vector computing unit 125.

Next, the classification unit 115 classifies the feature vector x converted by the feature-vector converting unit 110 by using a classification vector w (Step S104). The classification unit 115 outputs, to the embedding-matrix acquiring unit 120, the cluster number m of the cluster into which the feature vector x is classified.

Next, the embedding-matrix acquiring unit 120 acquires the embedding matrix Vm from the second storage 155 on the basis of the cluster number m input from the classification unit 115 (Step S106). The embedding-matrix acquiring unit 120 outputs the acquired embedding matrix Vm to the embedding-vector computing unit 125.

Next, the embedding-vector computing unit 125 multiplies the feature vector x by the embedding matrix Vm acquired by the embedding-matrix acquiring unit 120 so as to compute the embedding vector z (Step S108). The embedding-vector computing unit 125 outputs the computed embedding vector z to the label acquiring unit 130.

Next, the label acquiring unit 130 reads the label data 162 and the graph index 164 from the third storage 160. The label acquiring unit 130 searches, by using the approximate nearest neighbor search, the plurality of label data 162 stored in the third storage 160 for an embedding vector similar to the embedding vector z computed by the embedding-vector computing unit 125. Next, the label acquiring unit 130 acquires the label vector y associated with the embedding vector obtained by the search (Step S110).

Next, the label acquiring unit 130 acquires the label L corresponding to the acquired label vector y as a label to be provided to the target data TD. As described above, the label acquiring unit 130 may derive the label L by using a table obtained by associating label vectors and labels with one other.

The label acquiring unit 130 outputs the acquired label L to the communication unit 135. The communication unit 135 transmits the label L acquired by the label acquiring unit 130 to the data server 200 (Step S112), and returns the process to the above Step S11. The above is a procedure for the label providing process.

4. Flowchart of Process for Acquiring Label Vector

Figure 9:
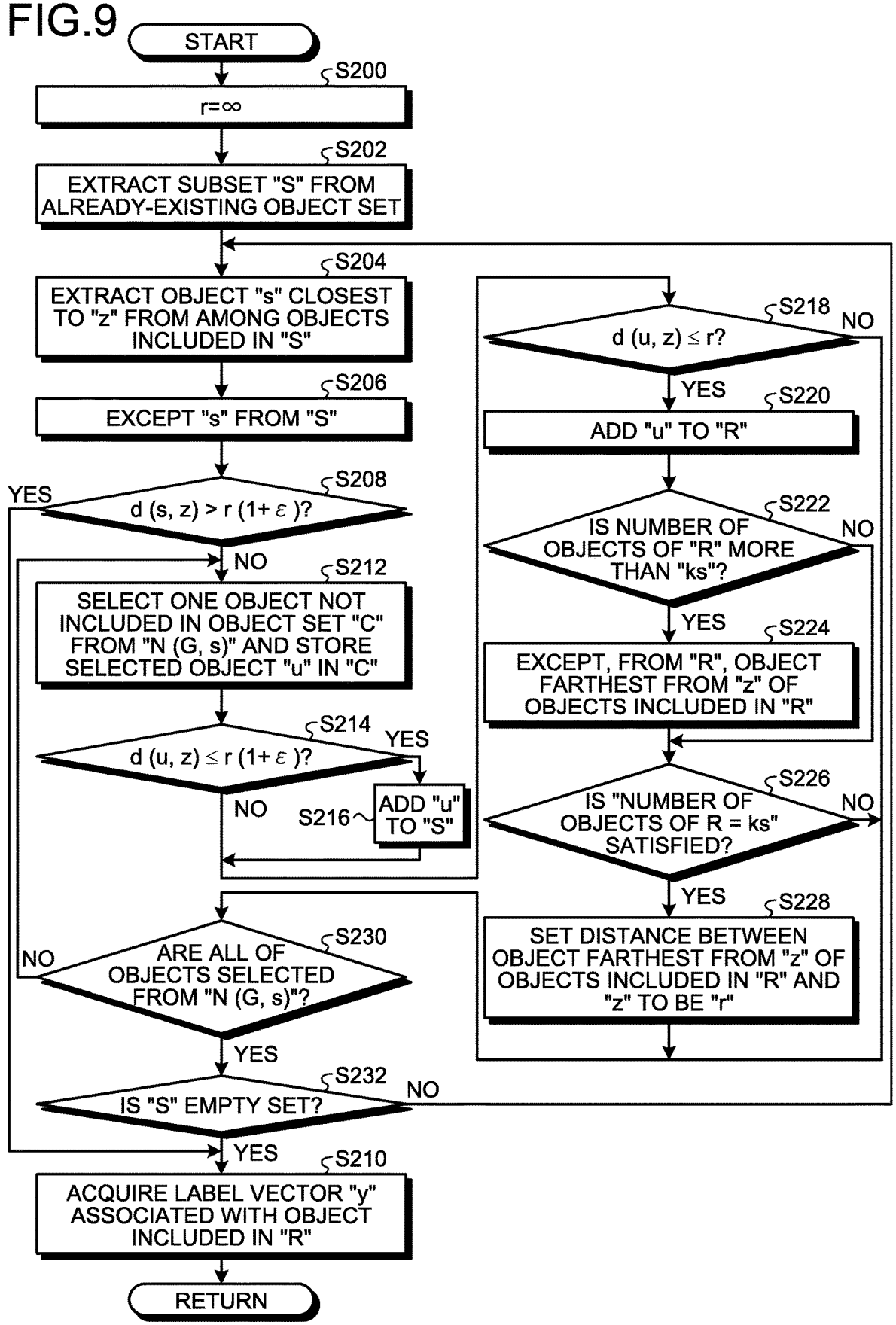
FIG. 9 is a flowchart illustrating a process for acquiring a label vector y according to the embodiment.

FIG. 9 is a flowchart illustrating a process for acquiring the label vector y according to the embodiment. The process indicated by this flowchart is to be executed by the label acquiring unit 130. This flowchart specifically indicates the process of Step S110 illustrated in FIG. 8.

As illustrated in FIG. 9, the label acquiring unit 130 sets a radius r of a hypersphere to be infinity ($\infty$) (Step S200), and extracts a subset S from an object set included in the label data 162 (Step S202). The hypersphere is an imaginary sphere that indicates a search range (within the range, there exists possibility of being included in elements of neighbor object set N (G, z) of the embedding vectors z). The neighbor object set N (G, z) of the embedding vector z is a set of a predetermined number kp objects selected in the order from shortest to longest distance from the embedding vector z, and is a set of reference-destination objects whose reference source is the embedding vector z. The objects included the object set S, which are extracted in Step S202, may be simultaneously included in an initial set of the object set R.

Next, the label acquiring unit 130 extracts the object s having the shortest distance from the embedding vector z from among the objects included in the object set S (Step S204). Next, the label acquiring unit 130 excepts the object s from the object set S (Step S206).

Next, the label acquiring unit 130 determines whether or not a distance d (s, z) between the object s and the embedding vector z exceeds "r $(1+\varepsilon)$" (Step S208). Herein, "$\varepsilon$" is an expanded element, and "r $(1+\varepsilon)$" is a value indicating a radius of the search range (range for determining whether or not neighbor object of object existing in the range is included in elements of the neighbor object set N (G, z) of the embedding vector z). When the distance d (s, z) between the object s and the embedding vector z exceeds "r $(1+\varepsilon)$," the label acquiring unit 130 advances the process to Step S210 to be mentioned later.

When the distance d (s, z) between the object s and the embedding vector z does not exceed "r $(1+\varepsilon)$," the label acquiring unit 130 selects one object not included in an object set C from among objects that are elements of a neighbor object set N (G, s) of the object s, and stores a selected object u in the object set C (Step S212). The object set C is expedientially provided for avoiding duplicated search, and thus is reset to be an empty set when the flowchart illustrated in FIG. 9 started.

Next, the label acquiring unit 130 determines whether or not a distance d (u, z) between the object u and the embedding vector z is equal to or less than "r $(1+\varepsilon)$" (Step S214). When the distance d (u, z) between the object u and the embedding vector z equal to or less than "r $(1+\varepsilon)$," the label acquiring unit 130 adds the object u to the object set S (Step S216).

Next, the label acquiring unit 130 determines whether or not the distance d (u, z) between the object u and the embedding vector z is equal to or less than "r" (Step S218). When the distance d (u, z) between the object u and the embedding vector z is more than "r," the process is advanced to Step S230 to be mentioned later.

When the distance d (u, z) between the object u and the embedding vector z equal to or less than "r," the label acquiring unit 130 adds the object u to the object set R (Step S220).

The label acquiring unit 130 determines whether or not the number of objects included in the object set R is more than "ks" (Step S222). The predetermined number ks is a natural number that is determined arbitrarily. For example, ks=3.

When the number of objects included in the object set R is more than "ks," the label acquiring unit 130 excepts, from the object set R, an object having the longest distance from the embedding vector z of the objects included in the object set R (Step S224).

Next, the label acquiring unit 130 determines whether or not the number of objects included in the object set R is equal to "ks" (Step S226). When the number of objects included in the object set R is equal to "ks," the label acquiring unit 130 sets, among the objects included in the object set R, a distance between an object having the longest distance from the embedding vector z and the embedding vector z to be new "r" (Step S228).

The label acquiring unit 130 determines whether or not the label acquiring unit 130 finishes selecting all of the objects from among the objects that are elements of the neighbor object set N (G, s) of the object s so as to store the selected objects in the object set C (Step S230). When the label acquiring unit 130 does not finish selecting all of the objects from among the objects that are elements of the neighbor object set N (G, s) of the object s so as to store the selected objects in the object set C, the process is returned to the above Step S212.

When finishing selecting all of the objects from among the objects that are elements of the neighbor object set N (G, s) of the object s so as to store the selected objects in the object set C, the label acquiring unit 130 determines whether or not the object set S is an empty set (Step S232). When the object set S is not an empty set, the process is returned to the above Step S204. On the other hand, when the object set S is an empty set, the label acquiring unit 130 acquires the label vector y associated with an object included in the object set R (Step S210), the process is advanced to Step S112 illustrated in FIG. 8 (Step S234).

As described above, the third storage 160 stores the plurality of label data 162 with which label vectors and embedding vectors are associated. The label acquiring unit 130 searches, by using the approximate nearest neighbor search, the plurality of label data 162 stored in the third storage 160 for an embedding vector similar to the embedding vector z computed by the embedding-vector computing unit 125. The label acquiring unit 130 acquires the label vector y associated with an embedding vector acquired by search, and further acquires the label L corresponding to the acquired label vector y as a label to be provided to the target data TD.

By employing the approximate nearest neighbor search according to the present embodiment, an embedding vector similar to the embedding vector z can be acquired without checking all of the embedding vectors included in the label data 162. Thus, the label providing apparatus 100 according to the present embodiment can provide a label to the target data TD in a short time.

5. Process for Learning Classification Vector to be Executed by First Learning Unit Next, details of the process for learning the classification vectors w1 to wn (see FIG. 3) stored in the first storage 150, which is to be executed by the first learning unit 140, will be explained. The first learning unit 140 executes the process for learning the classification vectors w1 to wn, whereby the classification unit 115 can execute the process for classifying the feature vector x with high precision.

FIG. 10 is a diagram illustrating one example of the first learning data D1 according to the embodiment. The first learning unit 140 learns the classification vectors w1 to wn included in the classification vector data 152 by using the first learning data D1. The first learning data D1 is data obtained by associating a first feature vector xi and a second feature vector xj with each other. Herein, "i" and "j" indicate indexes (subscripts). In the example illustrated in FIG. 10, each of the first feature vector xi and the second feature vector xj is a "p"-dimensional vector.

Specifically, the first learning unit 140 derives a classification vector wci such that a value indicated by the following formula (1) becomes maximum. In the formula (1), Ni indicates a set (N-neighboring points) of indexes of "N" label vectors. Values of inner products between a first label vector yi corresponding to the first feature vector xi and the "N" label vectors are upper-order values. "S−" indicates a set of indexes that are sampled at random.

$$\max_{w_{c_i}} \left\{ \sum_{j \in N_i} \log \sigma(\cos(w_{c_i}, x_j)) + \sum_{k \in S^-} \log \sigma(-\cos(w_{c_i}, x_k)) \right\} \quad (1)$$

Here "ci" in the formula (1) is indicated in the following formula (2). In the formula (2), "c" indicates a cluster number.

$$c_i = \operatorname*{argmax}_{c} \cos(w_c, x_i) \quad (2)$$

In this manner, the first learning unit 140 acquires the second feature vectors xj corresponding to the upper-order "N" second label vectors yj whose values of inner products, each of which is obtained between the first feature vector xi corresponding to the first label vector yi and the first label vector yi, are in the order from largest to smallest, so as to learn the classification vectors wci by using the first feature vectors xi and the second feature vectors xj as the first learning data D1.

Specifically, the first learning unit 140 adjusts the classification vector wci such that a cosine similarity cos (wci, xj) between the classification vector wci to be used for classification of the first feature vector xi and the second feature vector xj (j∈Ni) becomes large.

The first learning unit 140 adjusts the classification vector wci such that a cosine similarity (wci, xk) between the classification vector wci to be used for classification of the first feature vector xi and a third feature vector xk (k∈S−) acquired at random becomes small.

The first learning unit 140 executes the above learning process by using all of the first feature vectors xi and the second feature vectors xj included in the first learning data D1 to be able to execute the learning process of the classification vectors w1 to wn included in the classification vector data 152.

As described above, the first learning unit 140 executes the process for learning the classification vectors w1 to wn included in the classification vector data 152, whereby the classification unit 115 can execute a process for classifying the feature vector x with high precision.

6. Process for Learning Embedding Matrix to be Executed by Second Learning Unit

Next, details of the process for learning the embedding matrices V1 to Vn (see FIG. 4) stored in the second storage 155, which is to be executed by the second learning unit 145, will be explained. The second learning unit 145 executes a process for learning the embedding matrices V1 to Vn, whereby the embedding-vector computing unit 125 can execute a process for computing the embedding vector z with high precision.

FIG. 11 is a diagram illustrating one example of the second learning data D2 according to the embodiment. The second learning unit 145 learns the embedding matrices V1 to Vn included in the embedding-matrix data 157 by using the second learning data D2. The second learning data D2 is data obtained by associating a first embedding vector zi and a second embedding vector zj with each other. Herein, "i" and "j" indicate indexes (subscripts). In the example illustrated in FIG. 11, each of the first embedding vector zi and the second embedding vector zj is a "p"-dimensional vector.

Specifically, the second learning unit 145 derives an embedding matrix V such that a value indicated by the following formula (3) becomes minimum. As described above, Ni indicates a set (N-neighboring points) of indexes of the upper-order "N" label vectors. Values of inner products between the first label vector yi corresponding to the first feature vector xi and the "N" label vectors are upper-order values. "S−" indicates a set of indexes that are sampled at random. Moreover, "γ" is a coefficient to be used for adjusting a range of the cosine.

$$\min_{V} \sum_{i=1}^{N_c} \sum_{j \in N_i} -\log \left( \frac{\exp(\gamma \cos(z_i, z_j))}{\exp(\gamma \cos(z_i, z_j)) + \sum_{k \in S^-} \exp(\gamma \cos(z_i, z_k))} \right) = \quad (3)$$

$$\min_V \sum_{i=1}^{N_c} \sum_{j \in N_i} \log\left(1 + \sum_{k \in S^-} \exp(-\gamma \cos(z_i, z_j) - \cos(z_i, z_k))\right)$$

Here cos (zi, zj) in the formula (3) is indicated in the following formula (4).

$$\cos(z_i, z_j) = \frac{z_i^T z_j}{\|z_i\| \|z_j\|} = \frac{x_i^T V^T V x_j}{\|V x_i\| \|V x_j\|} \quad (4)$$

In this manner, the second learning unit 145 acquires (i) the first embedding vectors zi corresponding to the first label vectors yi and (ii) the second embedding vectors zj corresponding to the upper-order "N" second label vectors yj whose values of inner products, each of which is obtained from the first label vector yi, are in the order from largest to smallest, so as to learn the embedding matrices V by using the first embedding vectors zi and the second embedding vectors zj as the second learning data D2.

Specifically, the second learning unit 145 adjusts the embedding matrix V such that a cosine similarity cos (zi, zj) between the first embedding vector zi and the second embedding vector zj becomes large.

The second learning unit 145 adjusts the embedding matrix V such that a cosine similarity cos (zi, zk) between the first embedding vector zi and a third embedding vector zk acquired at random becomes small.

The second learning unit 145 executes the above learning process by using all of the first embedding vectors zi and the second embedding vectors zj included in the second learning data D2 to be able to execute the learning process of the embedding matrices V1 to Vn included in the embedding-matrix data 157.

As described above, the second learning unit 145 executes the process for learning the embedding matrices V1 to Vn included in the embedding-matrix data 157, whereby the embedding-vector computing unit 125 can execute a process for computing the embedding vector z with high precision.

In the present embodiment, the embedding matrices V1 to Vn are learned by using the cosine similarities cos (zi, zj) and cos (zi, zk). Thus, there exists no need for a long-time calculation such as calculation of inner products, and thus it is possible to fast execute the process for learning the embedding matrices V1 to Vn.

7. Hardware Configuration

Figure 12:
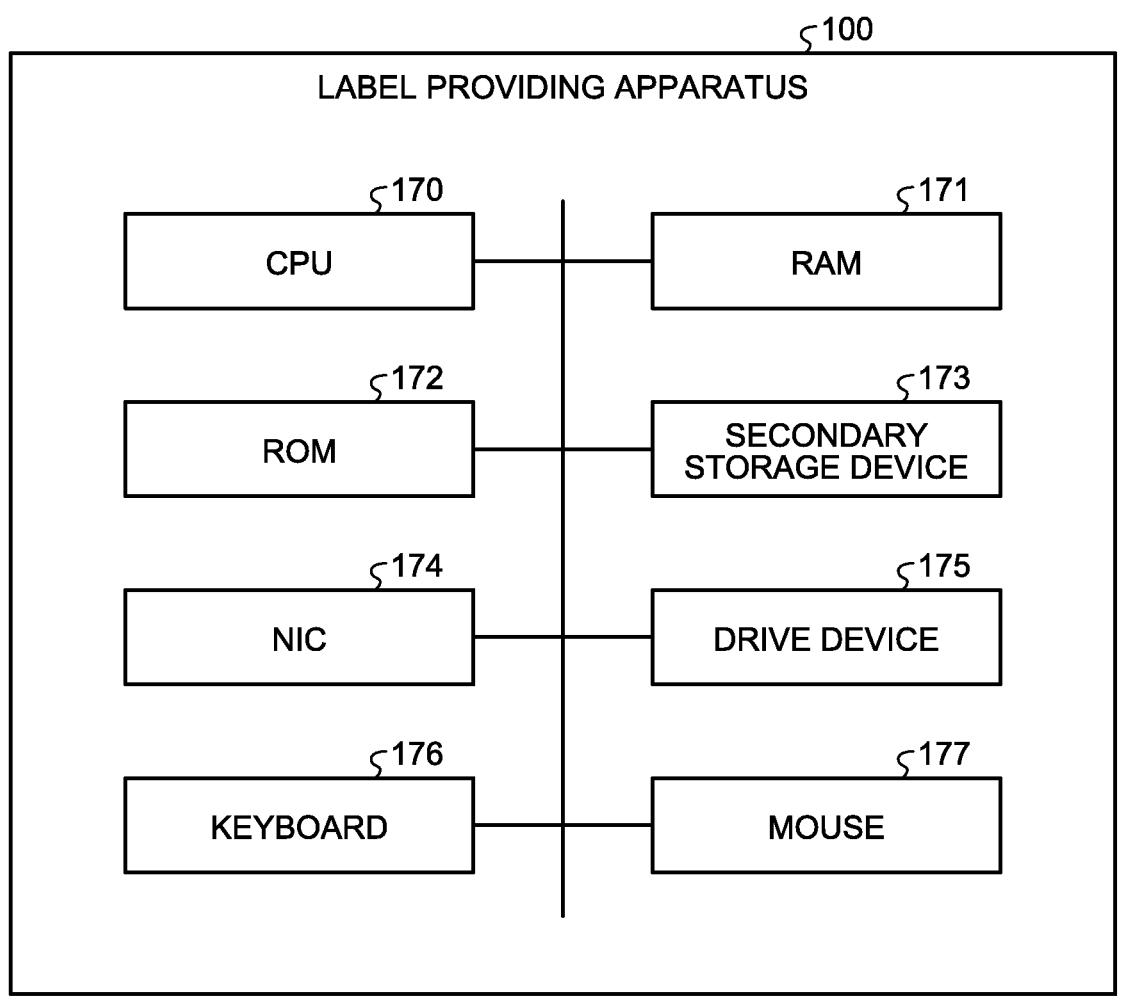
FIG. 12 is a diagram illustrating one example of a hardware configuration of the label providing apparatus 100 according to the embodiment.

FIG. 12 is a diagram illustrating one example of a hardware configuration of the label providing apparatus 100 according to the embodiment. The label providing apparatus 100 has a configuration in which a CPU 170, a RAM 171, a ROM 172, a secondary storage device 173 such as a flash memory and a HDD, an NIC 174, a drive device 175, a keyboard 176, and a mouse 177 are connected with one another by using an inner bus or a dedicated communication line, for example. The drive device 175 is provided with a portable recording medium such as an optical disk. A program, which is stored in a portable recording medium provided in the secondary storage device 173 or the drive device 175, is expanded in the RAM 171 by a Direct Memory Access (DMA) controller (not illustrated) to be executed by the CPU 170, whereby a function unit of the label providing apparatus 100 is realized.

As described above, the label providing apparatus 100 according to the embodiment includes the classification unit 115, the conversion unit (the embedding-matrix acquiring unit 120 and the embedding-vector computing unit 125), and the label acquiring unit 130. The classification unit 115 classifies the feature vector x, which is converted from the target data TD, by using the classification vector w. The conversion unit (the embedding-matrix acquiring unit 120 and the embedding-vector computing unit 125) converts, in accordance with a conversion rule according to classification by the classification unit 115, the feature vector x into the embedding vector z. The label acquiring unit 130 acquires, as the one or more labels L to be provided to the target data TD, one or more labels acquired on the basis of the embedding vector z obtained by the conversion performed by the conversion unit (the embedding-matrix acquiring unit 120 and the embedding-vector computing unit 125). Thus, it is possible to provide one or more labels to the target data precisely and fast.

In the above embodiment, the feature-vector converting unit 110 is configured to be provided in the label providing apparatus 100, however, the feature-vector converting unit 110 may be provided in a feature-vector converting device that is different from the label providing apparatus. In this case, the feature-vector converting device may convert the target data TD into the feature vector x, and may transmit the converted feature vector x to the label providing apparatus 100. The label providing apparatus 100 may provide the label L to the target data TD on the basis of the feature vector x received from the feature-vector converting device.

According to one aspect of the present disclosure, a label can be provided to target data precisely and fast.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a processor programmed to:
classify a feature vector by using a classification vector, the feature vector being converted from user inputted target data, which includes at least one of a search query and a browsing activity of the user;
convert the classified feature vector into an embedding vector in accordance with a conversion rule;
acquire, as one or more labels to be provided to the target data, one or more labels acquired based on the converted embedding vector;
acquire (i) a first feature vector corresponding to a first label vector and
(ii) a predetermined number of second feature vectors corresponding to a predetermined number of vectors of second label vectors, values of inner products between the first label vector and the predetermined number of second label vectors being upper-order values; and
learn the classification vector by using the first feature vector and the predetermined number of second feature vectors as learning data.

2. The information processing apparatus according to claim 1, wherein the processor is programmed to:
acquire an embedding matrix in accordance with the classification; and
multiply the feature vector by the acquired embedding matrix to compute an embedding vector.

3. The information processing apparatus according to claim 2, further comprising a memory configured to store a plurality of label data obtained by associating label vectors with embedding vectors, wherein:

the processor is programmed to:

search, by using an approximate nearest neighbor search, the plurality of label data stored in the memory for one or more embedding vectors similar to the computed embedding vector, acquire one or more label vectors associated with the searched one or more embedding vectors, and acquire one or more labels corresponding to the acquired one or more label vectors as the one or more labels to be provided to the target data.

4. The information processing apparatus according to claim 1, wherein the processor is programmed to adjust the classification vector to classify the first feature vector so that a cosine similarity between the classification vector and the predetermined number of second feature vectors is large.

5. The information processing apparatus according to claim 4, wherein the processor is programmed to adjust the classification vector to classify the first feature vector so that a cosine similarity between the classification vector and one or more third feature vectors acquired at random is small.

6. An information processing apparatus comprising: a processor programmed to:

classify a feature vector by using a classification vector, the feature vector being converted from user inputted target data, which includes at least one of a search query and a browsing activity of the user;

convert the classified feature vector into an embedding vector in accordance with a conversion rule;

acquire, as one or more labels to be provided to the target data, one or more labels acquired based on the converted embedding vector;

acquire (i) a first embedding vector corresponding to a first label vector, and (ii) a predetermined number of second embedding vectors corresponding to a predetermined number of vectors of second label vectors; values of inner products between the first label vector and the predetermined number of second label vectors being upper-order values; and learn the embedding matrix by using the first embedding vector and the predetermined number of second embedding vectors as learning data.

7. The information processing apparatus according to claim 6, wherein the processor is programmed to adjust the embedding matrix so that a cosine similarity between the first embedding vector and the predetermined number of second embedding vectors is large.

8. The information processing apparatus according to claim 7, wherein the processor is programmed to adjust the embedding matrix so that a cosine similarity between the first embedding vector and one or more third embedding vectors acquired at random is small.

9. An information processing method comprising:

classify a feature vector by using a classification vector, the feature vector being converted from user inputted target data, which includes at least one of a search query and a browsing activity of the user;

converting the classified feature vector into an embedding vector in accordance with a conversion-rule;

acquiring, as one or more labels to be provided to the target data, one or more labels acquired based on the converted embedding vector;

acquiring (i) a first feature vector corresponding to a first label vector and (ii) a predetermined number of second feature vectors corresponding to a predetermined number of vectors of second label vectors, values of inner products between the first label vector and the predetermined number of second label vectors being upper-order values; and learning the classification vector by using the first feature vector and the predetermined number of second feature vectors as learning data.

10. A non-transitory computer-readable recording medium having stored therein a program that causes a computer to execute a process comprising:

classify a feature vector by using a classification vector, the feature vector being converted from user inputted target data, which includes at least one of a search query and a browsing activity of the user;

converting the classified feature vector into an embedding vector in accordance with a conversion rule;

acquiring, as one or more labels to be provided to the target data, one or more labels acquired based on the converted embedding vector;

acquiring (i) a first feature vector corresponding to a first label vector and (ii) a predetermined number of second feature vectors corresponding to a predetermined number of vectors of second label vectors, values of inner products between the first label vector and the predetermined number of second label vectors being upper-order values; and learning the classification vector by using the first feature vector and the predetermined number of second feature vectors as learning data.

* * * * *